United States Patent
Henrie et al.

(10) Patent No.: US 7,007,117 B2
(45) Date of Patent: Feb. 28, 2006

(54) IDENTIFYING A TYPE OF CONNECTION AND SELECTING A CORRESPONDING FORM OF AN APPLICATION

(75) Inventors: James B. Henrie, Grayslake, IL (US); Edward Endejan, Gurnee, IL (US); Adam Hampson, Fremont, CA (US)

(73) Assignee: palmOne, Incorporated, Santa Clara, CA (US)

( * ) Notice: Subject to any disclaimer, the term of this patent is extended or adjusted under 35 U.S.C. 154(b) by 236 days.

(21) Appl. No.: 09/726,847

(22) Filed: Nov. 29, 2000

(65) Prior Publication Data

US 2002/0099878 A1 Jul. 25, 2002

(51) Int. Cl.
*G06F 3/00* (2006.01)
*G06F 3/02* (2006.01)
*G06F 13/12* (2006.01)

(52) U.S. Cl. .............................. 710/72; 710/8; 710/10; 710/11; 710/14; 710/36; 710/62; 710/63; 710/64; 708/131; 708/160

(58) Field of Classification Search ................. 710/8, 710/10, 11, 14, 36, 62, 63, 64, 72, 104, 105, 710/106, 228, 230, 232, 237; 708/131, 160
See application file for complete search history.

(56) References Cited

U.S. PATENT DOCUMENTS

| | | | |
|---|---|---|---|
| 5,602,750 A | * | 2/1997 | Severt et al. ............... 702/122 |
| 5,646,865 A | * | 7/1997 | Alfaro et al. ................ 701/29 |
| 5,655,092 A | * | 8/1997 | Ojala ......................... 710/300 |
| 5,939,875 A | * | 8/1999 | Felps et al. ................. 324/115 |
| 6,442,734 B1 | * | 8/2002 | Hanson et al. ................ 716/4 |
| 6,460,094 B1 | * | 10/2002 | Hanson et al. ................ 710/8 |

OTHER PUBLICATIONS

IBM Technical Disclosure Bulletin, Oct. 1989. "Cable Identification Means Using Active Circuitry for Data Communications Signal Cables" vol. 32, Issue 5A. pp. 59–61.*
IBM Technical Disclosure Bulletin, Apr. 1988. "Electronically Switchable Interface Circuit With Multiple EIA Protocol Drivers and Receivers" vol. 30, Issue 11. pp. 478–482.*

* cited by examiner

*Primary Examiner*—Jeffrey Gaffin
*Assistant Examiner*—Angel L. Casiano
(74) *Attorney, Agent, or Firm*—Wagner, Murabito & Hao LLP

(57) ABSTRACT

A method and system for automatically identifying the type of communication interface used to couple a portable computer system with a second computer system, and for selecting the form of an application that is used with the type of interface. For example, a debugger application is collaboratively executed on the computer systems over the interface. When entering the debugger mode, software executed on the portable computer system identifies the type of interface by reading a resistance value of a pin. After determining the type of interface, the form of the debugger used with the interface is automatically selected. A similar process is followed for other applications that depend on the type of interface. The user does not have to manually identify the type of interface. Instead, in response to a command that is independent of the type of interface, the proper form of the application is automatically selected.

18 Claims, 10 Drawing Sheets

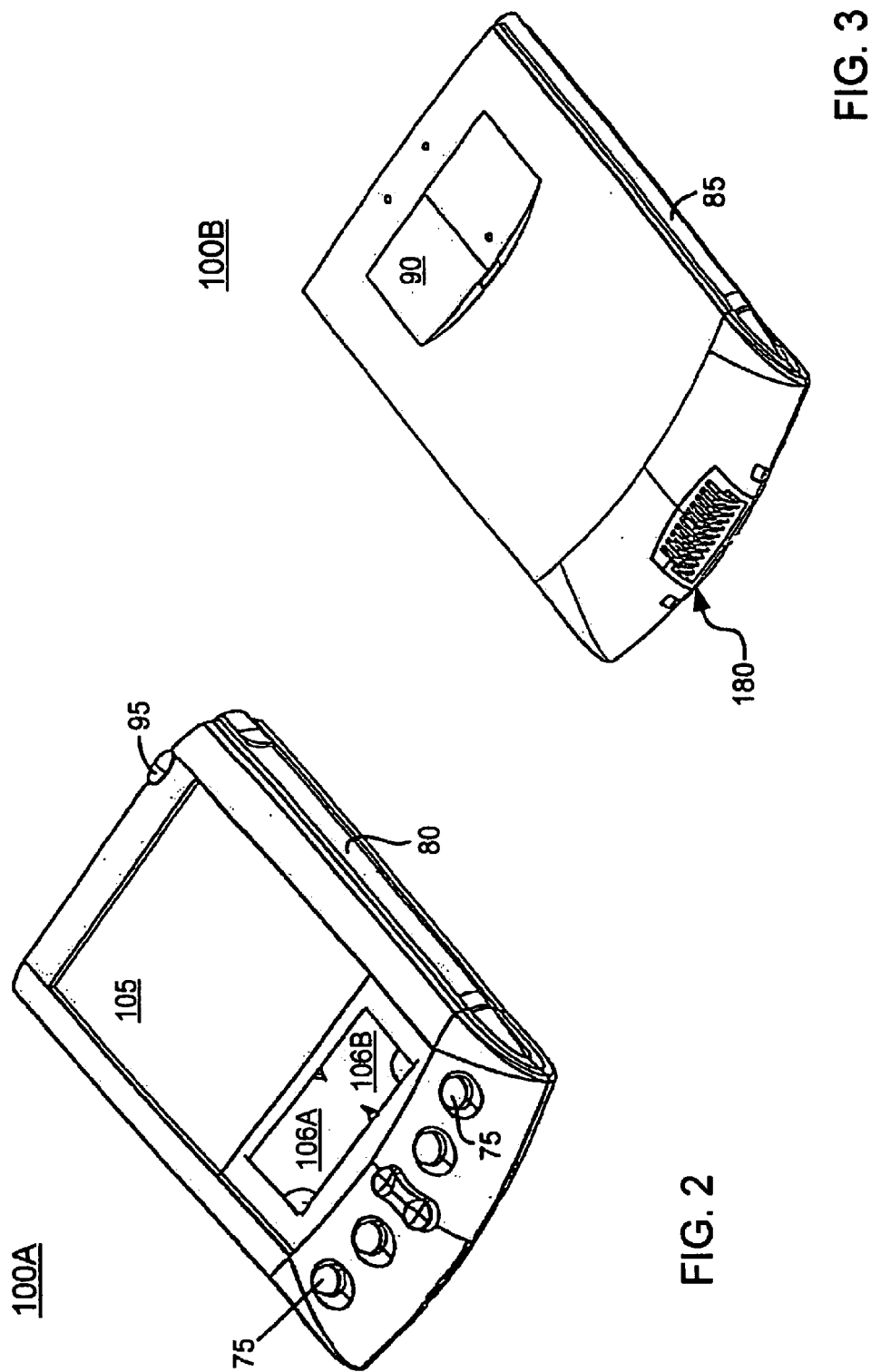

IDENTIFYING A TYPE OF CONNECTION AND SELECTING A CORRESPONDING FORM OF AN APPLICATION

BACKGROUND OF THE INVENTION

1. Field of the Invention

The present invention relates to the field of portable computer systems, such as personal digital assistants or palmtop computer systems. Specifically, the present invention relates to a method and system for automatically identifying a type of communication interface used to couple a portable computer system to another computer system, and for selecting the proper form of an application used with that type of communication interface.

2. Related Art

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

The portability and convenience of palmtops has made it increasingly desirable to increase the number and types of applications that can be run on them. It is advantageous to expand the capabilities of a palmtop so that it can provide many of the same, if not the same, services provided by a desktop or laptop computer system.

It has proven convenient to exchange applications, data and other information between a conventional computer system and a palmtop computer using a communication interface, such as a serial or parallel input port. Typically, the palmtop is placed into a device, such as a cradle, that is communicatively coupled to the conventional computer system via a connector cable. Many palmtop computers also include an infrared communication port for transmitting data over a wireless link. Thus, the communication interface provides a mechanism for transferring applications or other information from a conventional computer system to a palmtop, or from one palmtop to another.

In addition, cooperative and collaborative applications can be executed in parallel on both the conventional computer system and the palmtop using the communication interface. One example of these types of applications is the synchronization application and process for synchronizing and sharing information, data and the like between the conventional computer system and the palmtop. Certain portions of the synchronization software execute on the conventional computer system while other portions execute in parallel on the palmtop, with the respective portions communicating over the communication interface. Synchronization applications are known in the art. One common synchronization application and process is commonly referred to as "HotSync."

Another example of a collaborative application is the debugger application used for debugging hardware and software applications that are being developed for the palmtop. The debugger is used to monitor and debug the palmtop's software and hardware, in particular during the development stage. In a manner similar to that described above, the debugger software executes in parallel on the conventional computer system and the palmtop, with communication between the conventional computer system and the palmtop taking place over the communication interface. Debugger applications are also known in the art.

Currently, there are different types of communication interfaces that can be used to couple the conventional computer system and the palmtop. Many communication interfaces in use today utilize either a Universal Serial Bus (USB) connection or an RS232 connection. Other types of connections include Ethernet connections and wireless connections such as Bluetooth and infrared.

A problem that occurs in the prior art is that collaborative applications, such as the synchronization and debugger applications mentioned above, can depend on the type of communication interface in use. One driver is used for one type of communication interface, and a different driver is used for a different type of communication interface. For example, an RS232 debugger application is used with an RS232 connection, and a USB debugger application is used with a USB connection. Therefore, when a user wants to run the debugger application, he or she needs to first determine what type of communication interface is being used to couple the palmtop and the conventional computer system. Then, the user needs to select the appropriate form of application that is used with the type of communication interface being used.

In one prior art implementation, a user identifies the type of connection being used (e.g., either RS232 or USB), then manually selects the appropriate form of application by pushing certain buttons on the palmtop in a prescribed manner. For example, the user pushes one combination of buttons in order to implement the debugger application that is used with USB, and a different combination of buttons (or a single button) in order to implement the debugger application that is used with RS232. Other prior art implementations of palmtops typically have their own unique processes for identifying the type of communication interface and selecting the proper form of application to use.

Thus, in the prior art, the user needs to first recognize what type of communication interface is being used between the palmtop and the conventional computer system. The user also needs to be familiar with the particular implementation-dependent mechanism that is to be used to identify the type of communication interface and to select the application that is used with that interface.

Thus, in the prior art, the user is inconvenienced by having to learn the various implementation-specific processes for selecting and implementing the proper form of application used with the type of communication interface. Moreover, the prior art is prone to error should the user fail to correctly recognize the type of communication interface being used, or should the user fail to correctly implement the proper selection process for the make and model of palmtop being used.

In addition, many users may not even be aware that there are differences in communication interfaces for palmtops. For example, the user may reasonably expect that the communication interface (e.g., cradle and connector) at the office and the communication interface at home are identical with respect to the type of connection used, when in fact they are not. Consequently, the user may not recognize that one form of synchronization application is used in the office, and another at home. Thus, the user will be unnecessarily inconvenienced and frustrated by having to determine why the synchronization application is not functioning properly in one location while working in the other. This can increase the number of service calls that users need to make. Once the cause of the problem is identified, the user is still inconvenienced by having to learn and execute the technique to select and implement the proper form of synchronization application depending on his/her location.

SUMMARY OF THE INVENTION

Accordingly, what is needed is a system and/or method that can simplify the process for identifying the type of communication interface being used to couple a portable computer system (e.g., a palmtop) and a second (e.g., conventional) computer system. What is also needed is a system and/or method that can satisfy the above need and that can simplify the process for selecting the form of an application that is used with the type of communication interface in use. The present invention provides these advantages and others not specifically mentioned above but described in the sections to follow.

A method and system are described for automatically identifying the type of communication interface used to couple a portable computer system with a second computer system, and for automatically selecting the form of an application (e.g., the proper driver) that is used with the type of communication interface. In the present embodiment, the communication interface can be either a Universal Serial Bus (USB) connection or an RS232 connection. In various other embodiments, other types of connections can be used, including Ethernet, and also including wireless connections such as Bluetooth and infrared.

In one embodiment, a debugger application is collaboratively executed on the portable computer system and the second computer system over the communication interface. The portable computer system enters the debugger mode in response to input from a user. The user input is the same regardless of the type of communication interface. When entering the debugger mode, a software routine is executed on the portable computer system. The software routine identifies the type of communication interface by reading a resistance value (or voltage value) of a pin on the communication interface. A particular resistance value is associated with each type of communication interface. After determining the type of communication interface, the form of the debugger application (and driver) used with the communication interface is automatically selected.

In another embodiment, a synchronization application (for synchronizing and sharing information between the portable computer system and the second computer system) is collaboratively executed over the communication interface. In a manner similar to that described above, the type of communication interface is identified, and the form of the synchronization application (and driver) used with the communication interface is automatically selected.

The present invention can also be used with other applications that are dependent on the type of communication interface. Thus, the user does not have to manually identify the type of communication interface in order to select the proper form of application. Instead, the user enters a command that is independent of the type of communication interface. In response, the type of communication interface is automatically identified, and the proper form of application (and driver) is automatically selected. The use of a standard and automatic process that is independent of the type of communication interface in use or the form of the application that is to be executed provides a simplified and convenient process that is user-friendly and that can reduce the potential for error.

BRIEF DESCRIPTION OF THE DRAWINGS

FIG. 2 is a top side perspective view of a portable computer system in accordance with one embodiment of the present invention.

FIG. 3 is a bottom side perspective view of the portable computer system of FIG. 2.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "entering" or "reading" or "identifying" or "selecting" or "sharing" or "debugging" or the like, refer to the action and processes of a computer system (e.g., process 1000 of FIG. 10), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System-to-palmtop Connection

Figure 1:
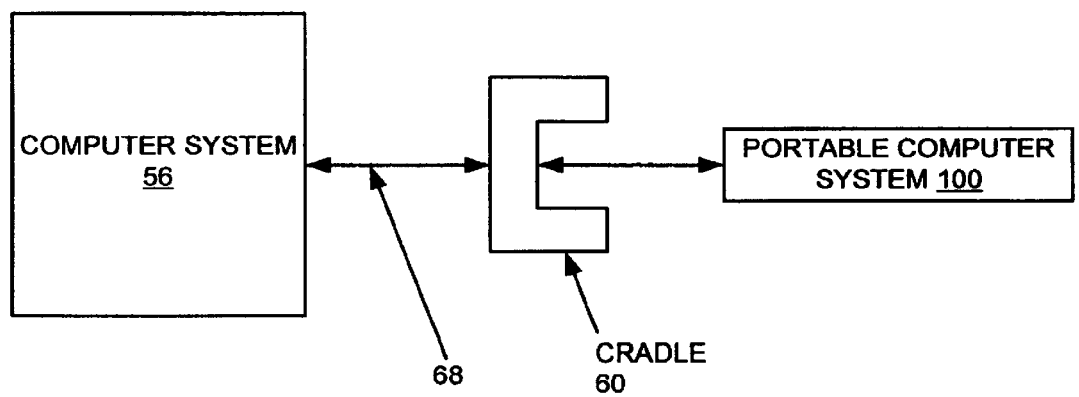
FIG. 1 is a block diagram showing one embodiment for communicatively coupling a portable computer system to a second computer system in accordance with the present invention.

FIG. 1 is a block diagram showing one embodiment of a system 51 for coupling a portable computer system 100 to other computer systems in accordance with the present invention. System 51 is described in the context of wired connections between its various devices and components; however, it is appreciated that wireless connections (such as but not limited to Bluetooth or infrared wireless connections) can also be used.

System 51 comprises a host computer system 56 which can either be a desktop unit or a laptop unit. Host computer system 56 is shown connected to a connection cable 68, which can be a serial bus (e.g., RS232), a parallel bus, a Universal Serial Bus (USB), or any other type of workable connection including an Ethernet Local Area Network (LAN).

Importantly, in the present embodiment, host computer system 56 is coupled via connection cable 68 to a cradle 60 for receiving and initiating communication with portable computer system 100. Portable computer system 100 is also referred to as a personal digital assistant (PDA), a portable information device (PID), a palmtop, or a hand-held computer system. In the present embodiment, connection cable 68 and cradle 60 thus provide the communication interface between host computer system 56 and portable computer system 100.

Cradle 60 provides an electrical communication and mechanical interface between connection cable 68 and portable computer system 100 for two-way communications with host computer system 56. In the present embodiment, portable computer system 100 is inserted into and coupled with cradle 60 using a communication interface port (not shown). Additional information regarding the communication interface port and cradle 60 is provided in conjunction with FIGS. 3 and 6A, below.

Exemplary Palmtop System

FIG. 2 is a perspective illustration of the top face 100a of one embodiment of the portable computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material suitable to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

FIG. 3 illustrates the bottom side 100b of one embodiment of the portable computer system 100 that can be used in accordance with various embodiments of the present invention. An extendible antenna 85 is shown, and also a battery storage compartment door 90 is shown. A communication interface port 180 is also shown. In accordance with the present invention, the communication interface port 180 can use any of a number of well-known communication standards and protocols, including but not limited to serial (e.g., RS232), parallel, USB, SCSI (small computer system interface), Firewire (IEEE 1394), and Ethernet. It is also appreciated that a wireless communication standard and protocol can also be used, such as that defined by Bluetooth or the Infrared Data Association (IrDA).

Figure 4:
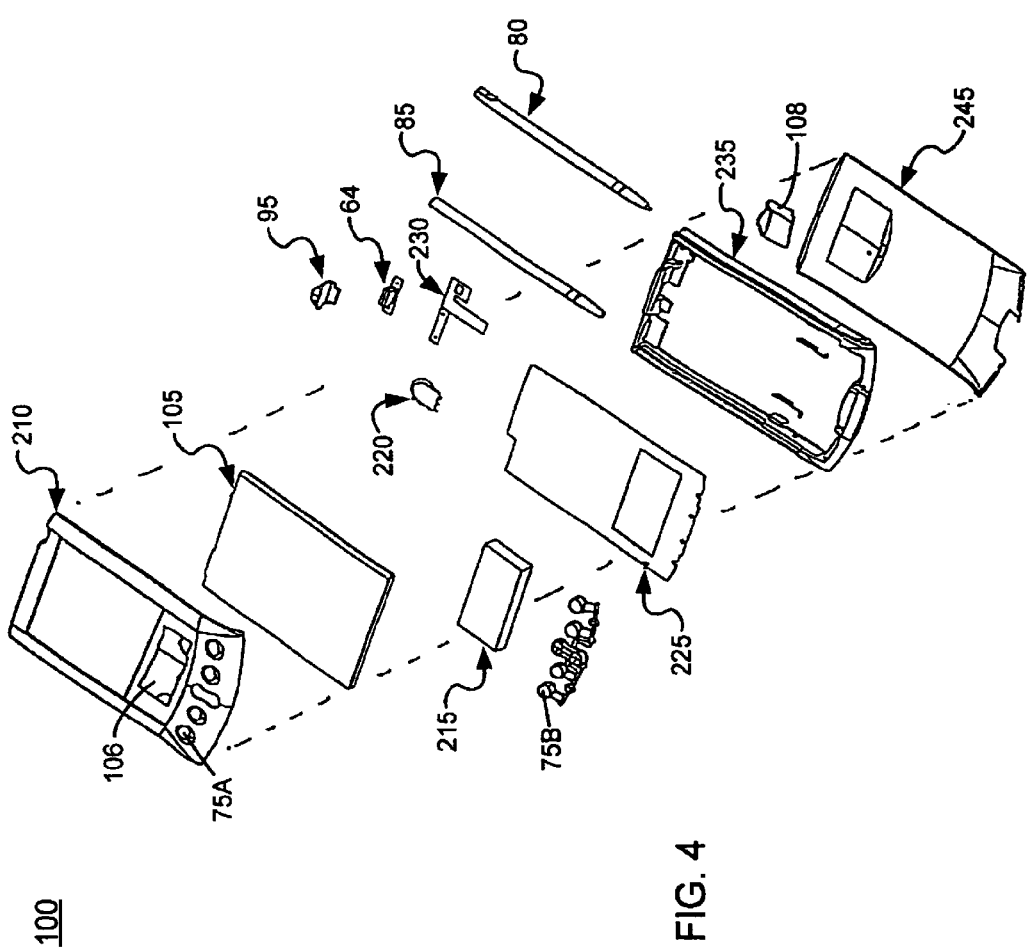
FIG. 4 is an exploded view of the components of the portable computer system of FIG. 2.

FIG. 4 is an exploded view of the portable computer system 100 in accordance with one implementation. Portable computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

In the present embodiment, infrared communication mechanism 64 (e.g., an infrared emitter and detector device) is for sending and receiving information from other similarly equipped devices. In one embodiment, a signal (e.g., radio) receiver/transmitter device 108 is also present. The receiver/transmitter device 108 is coupled to the antenna 85 and also coupled to communicate with the PC board 225. In one implementation, the Mobitex wireless communication system is used to provide two-way communication between computer system 100 and other computers and/or the Internet via a proxy server.

Figure 5:
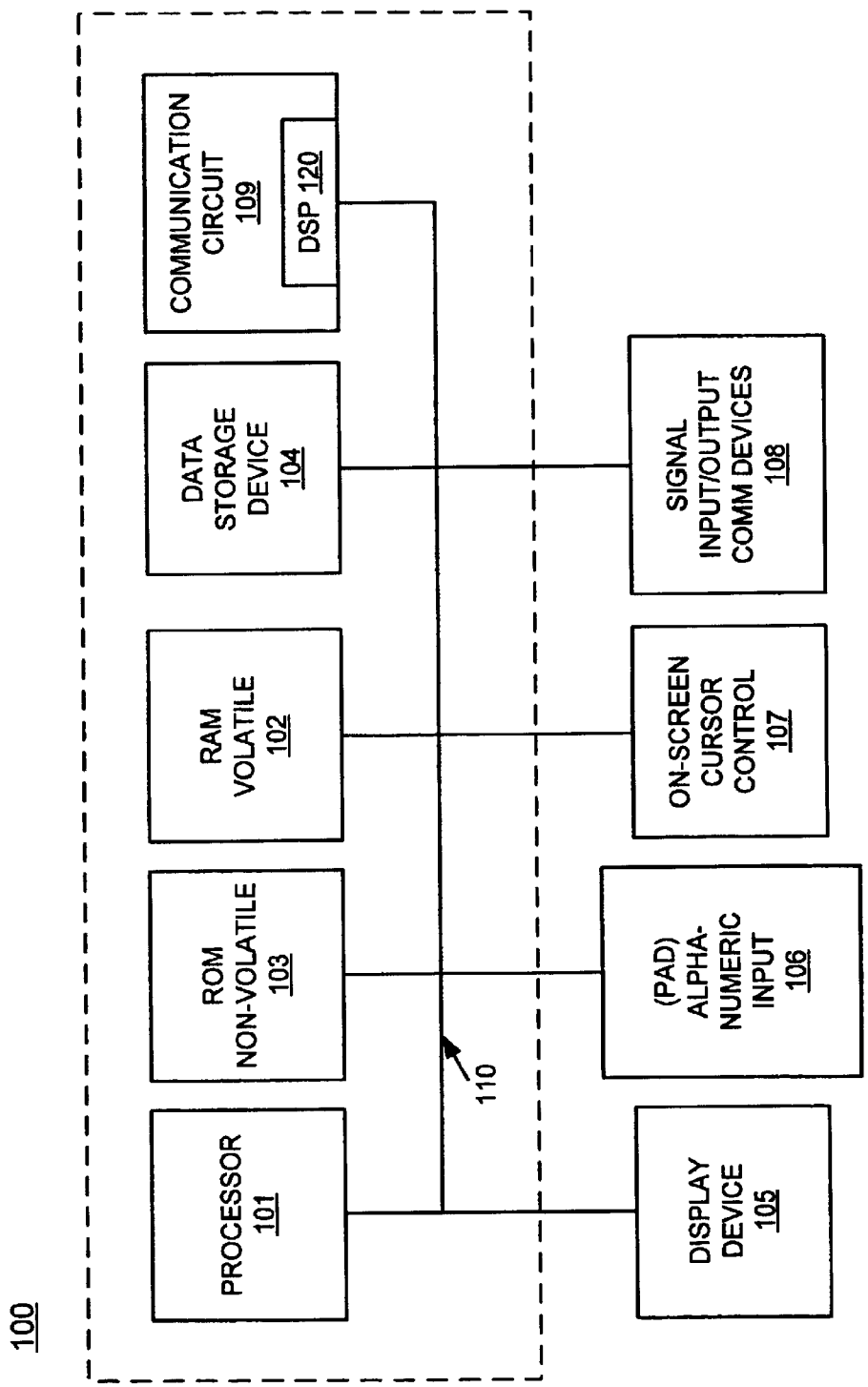
FIG. 5 is a functional block diagram of one embodiment of a portable computer system in accordance with the present invention.

FIG. 5 illustrates circuitry of portable computer system 100, some of which can be implemented on PC board 225 (FIG. 4). Portable computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Portable computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, portable computer system 100 also includes a signal transmitter/receiver device 108, which is coupled to bus 110 for providing a wireless communication link between portable computer system 100 and other similarly equipped devices. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, portable computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in portable computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Portable computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6A:
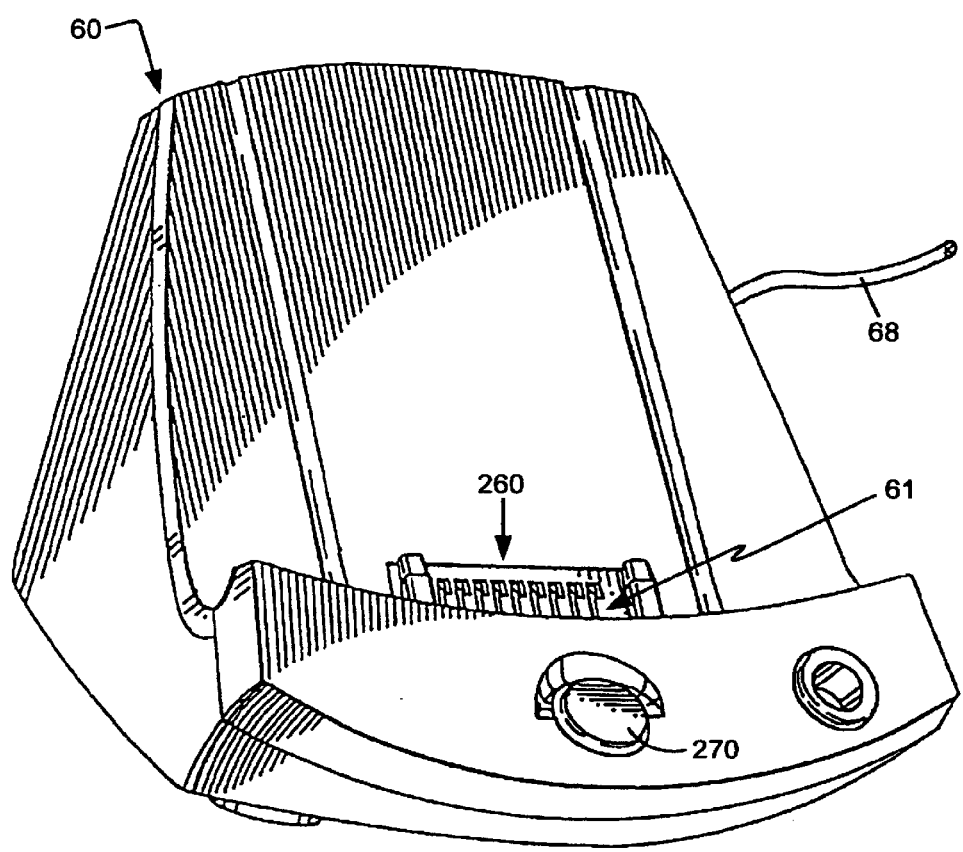
FIG. 6A is a perspective view of one embodiment of a communication interface for connecting the portable computer system to another computer system in accordance with the present invention.

FIG. 6A is a perspective illustration of one embodiment of a communication interface 600 for receiving the portable computer system 100. In the present embodiment, communication interface 600 comprises a cradle 60 and a connection cable 68. In other embodiments, communication interface 600 can include a wireless connection in lieu of connection cable 68 and/or cradle 60.

In the present embodiment, cradle 60 contains a mechanical and electrical interface 260 for interfacing with communication interface 180 (FIG. 3) of computer system 100 when system 100 is slid into the cradle 60 in an upright position. Once inserted, button 270 can be pressed to initiate two-way communication (e.g., a communication session) between portable computer system 100 and computer system 56 coupled to connection cable 68 (see FIG. 1).

In one embodiment, the communication session is for executing a cooperative or collaborative application (applications executing in parallel on computer 56 and portable computer system 100), such as synchronization applications or debugger applications. These types of applications are described in FIGS. 8 and 9, respectively, although it is appreciated that other types of applications can be used in accordance with the present invention.

With reference to FIG. 6A, as described previously herein, connection cable 68 can be a serial bus (e.g., RS232), a parallel bus, a Universal Serial Bus (USB), or any other type of workable connection. In accordance with the present embodiment, the type of connection cable 68 being used for communication interface 600 is automatically identified. In the present embodiment, interface 260 includes a pin 61. Portable computer system 100 reads the resistance value (or voltage value) associated with pin 61 in order to determine the type of connection cable 68 used with communication interface 600. A unique resistance (or voltage) value is associated with each type of connection cable 68, and thus portable computer system 100 can identify the type of connection cable 68 (and hence the type of communication interface 600).

Also in accordance with the present invention, once the type of communication interface is identified, the form of application used with the type of communication interface is automatically selected and executed. Additional information is provided in conjunction with FIG. 10.

Figure 6B:
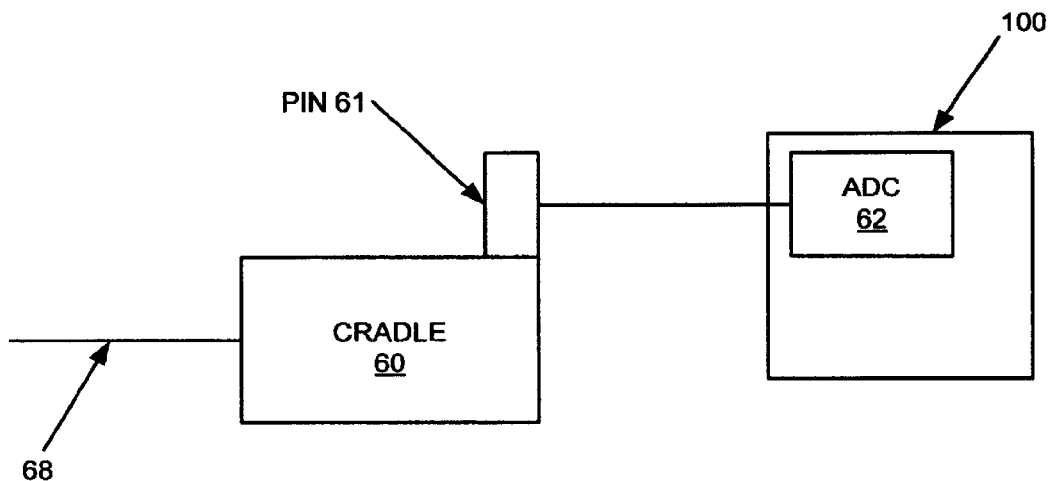
FIG. 6B is a block diagram showing one embodiment of a mechanism for identifying the type of communication interface in accordance with the present invention.

FIG. 6B illustrates one embodiment of a mechanism for identifying the type of communication interface 600 in accordance with the present invention. In this embodiment, analog-to-digital converter (ADC) 62 of portable computer system 100 determines the type of communication interface 600 by reading the voltage (or resistance) of pin 61 on cradle 60. Pin 61 is attached to a resistor divider (not shown) that will give a different voltage (or resistance) for each type of connection cable 68. Each type of connection cable 68 is associated with a particular (pre-defined) resistance value, and so portable computer system 100 can identify the type of communication interface 600 based on the resistance value read by ADC 62. It is appreciated that there are tolerances associated with the values of voltage and resistance and also with the accuracy with which those values are read by ADC 62. Accordingly, computer system 100 can still identify the type of communication interface 600 even with some variation in these values.

Exemplary Computer System Platform

Figure 7:
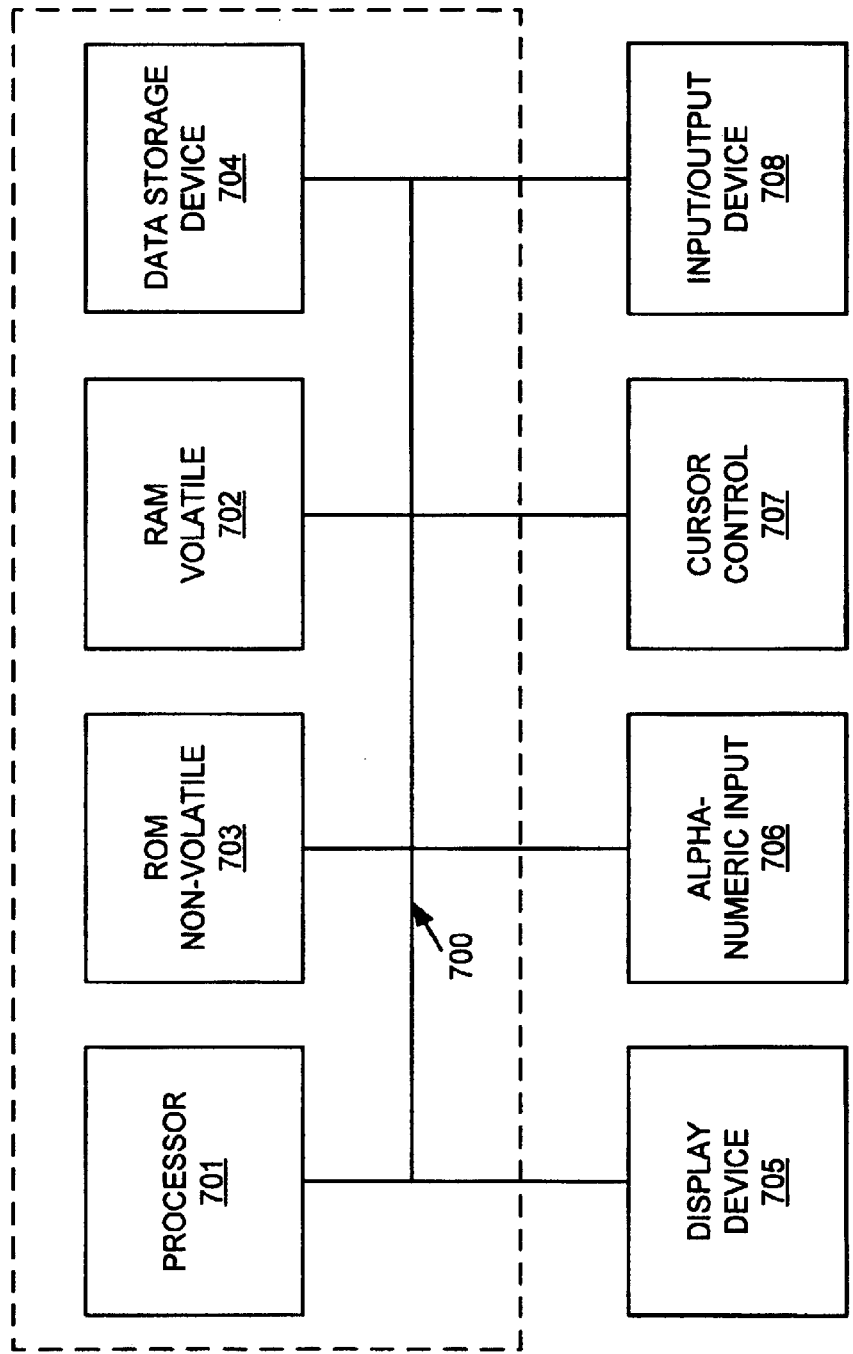
FIG. 7 is a functional block diagram of one embodiment of a server, desktop or laptop computer system in accordance with the present invention.

Refer now to FIG. 7 which illustrates an exemplary computer system 56 with which embodiments of the present invention may be practiced. In general, computer system 56 comprises bus 700 for communicating information, processor 701 coupled with bus 700 for processing information and instructions, random access (volatile) memory (RAM) 702 coupled with bus 700 for storing information and instructions for processor 701, read-only (non-volatile) memory (ROM) 703 coupled with bus 700 for storing static information and instructions for processor 701, data storage device 704 such as a magnetic or optical disk and disk drive coupled with bus 700 for storing information and instructions, an optional user output device such as display device 705 coupled to bus 700 for displaying information to the computer user, an optional user input device such as alphanumeric input device 706 including alphanumeric and function keys coupled to bus 700 for communicating information and command selections to processor 701, and an optional user input device such as cursor control device 707 coupled to bus 100 for communicating user input information and command selections to processor 701. Furthermore, input/output (I/O) device 708 is used to couple computer system 56 to a communication bus (e.g., connection cable 68 of FIG. 1).

Continuing with reference to FIG. 7, display device 705 utilized with computer system 56 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Exemplary Synchronization Architecture

Figure 8:
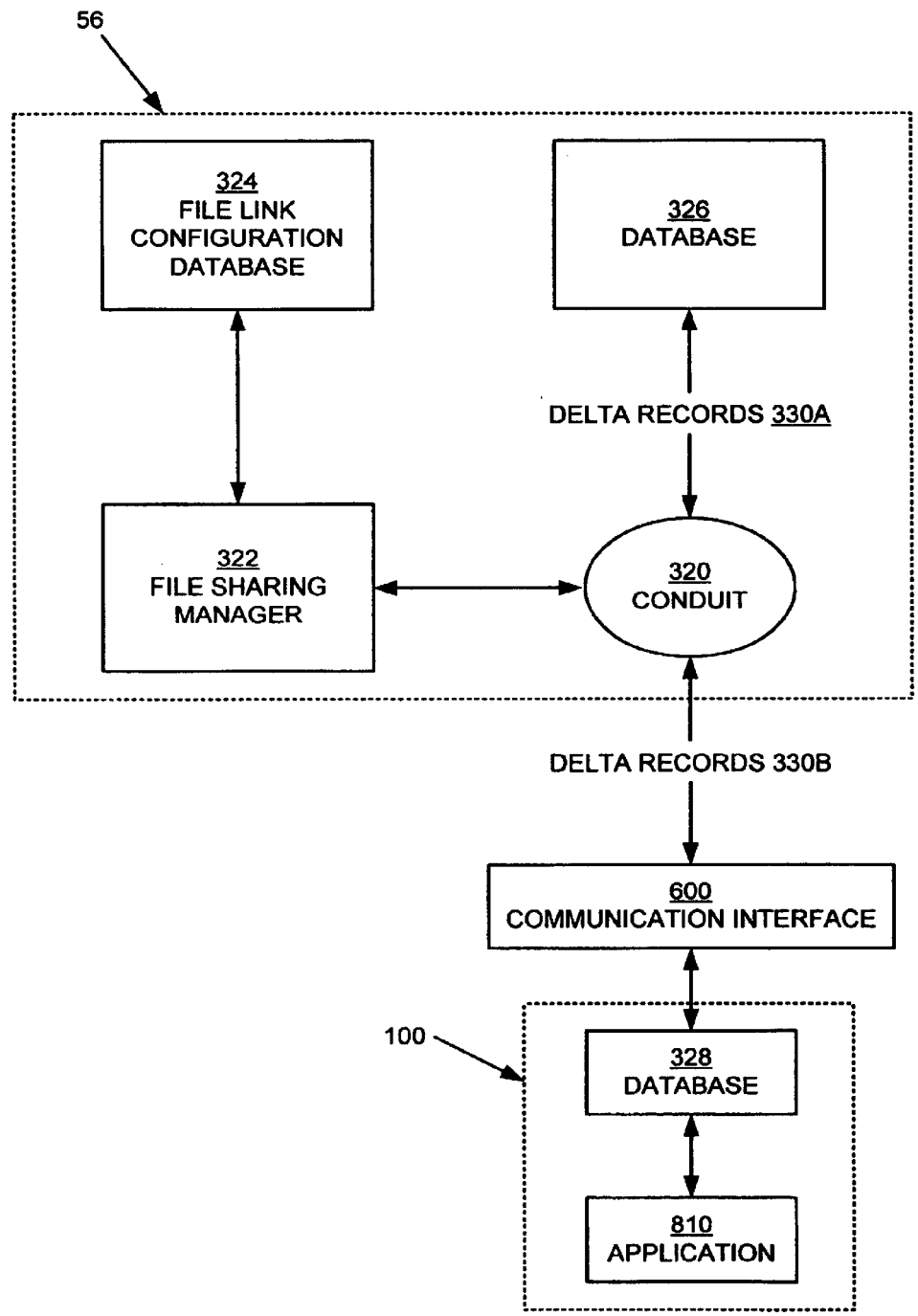
FIG. 8 is a data flow diagram of a one embodiment of a synchronization application in accordance with the present invention.

FIG. 8 is a data flow diagram illustrating the software architecture of a synchronization application in accordance with one embodiment of the present invention. A synchronization application is used to share data and other information between portable computer system 100 and another computer such as computer system 56. Portable computer system 100 is interfaced with computer system 56 using communication interface 600. Synchronization applications are known in the art.

The synchronization application uses database 326, a software file sharing manager 322 (e.g., a hot-sync software manager), a file link configuration database 324, and a software conduit 320 that each reside on computer system 56. Residing on portable computer system 100 is database 328 and a portion of the synchronization application (810) that executes on portable computer system 100 in collaboration with the synchronization application executing on computer system 56.

The file link configuration database 324 is linked to the file sharing manager 322 and specifies, for a particular database, its source file, category information, and the frequency of update for the database. Conduit 320 outlines the manner in which records are to be synchronized between databases under control of file sharing manager 322. This process, including the file sharing manager and the conduit, is described in U.S. Pat. No. 5,884,323 by Hawkins et al., issued Mar. 16, 1999, assigned to the assignee of the present invention and hereby incorporated by reference.

During synchronization between portable computer system 100 and database 326, delta records 330a and 330b are passed through conduit 320 between database 326 and database 328 under control of the file sharing manager 322. Delta records 330a and 330b represent changes (including additions) that occurred on either portable computer system 100 or computer system 56. After synchronization, the databases 326 and 328 will contain the same information. The synchronization process (including the file sharing manager) is described in U.S. Pat. No. 6,006,274 by Hawkins et al., issued Dec. 21, 1999, assigned to the assignee of the present invention and hereby incorporated by reference. Synchronization is also described in U.S. Pat. No. 5,727,202 by Kucala, issued Mar. 10, 1998, assigned to the assignee of the present invention and hereby incorporated by reference, and also in U.S. Pat. No. 5,832,489 by Kucala, issued Nov. 3, 1998, assigned to the assignee of the present invention and hereby incorporated by reference.

Exemplary Debugger Architecture

Figure 9:
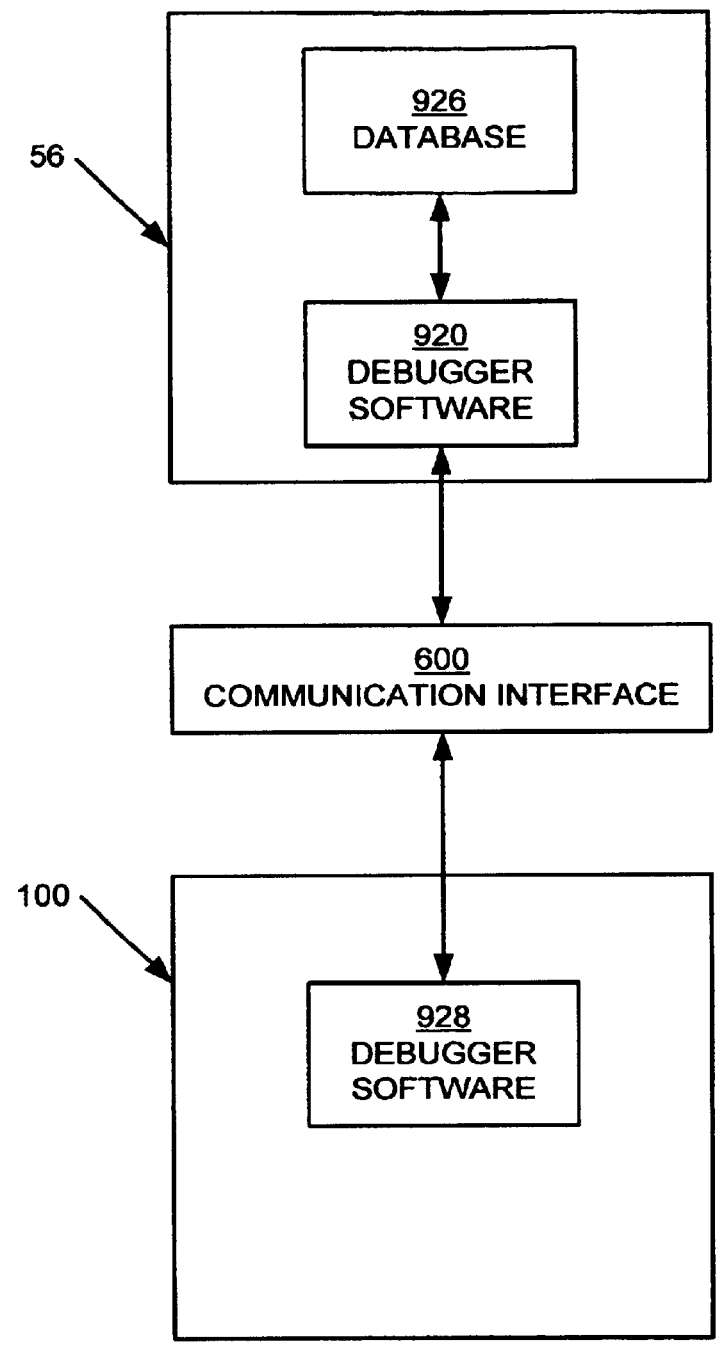
FIG. 9 is a data flow diagram of one embodiment of a debugger application in accordance with the present invention.

FIG. 9 is a data flow diagram illustrating the software architecture of a debugger application in accordance with one embodiment of the present invention. The debugger application is used to monitor and debug software and hardware used by portable computer system 100. Portable computer system 100 is interfaced with computer system 56 using communication interface 600. Debugger applications are known in the art.

Residing on portable computer system 100 is a portion of the debugger application (928) that executes on portable computer system 100 in collaboration with the portion of the debugger application (920) that is executing on computer system 56. A database 926 may also reside on computer system 56. Database 926 is for receiving and storing the results of break point analyses, trace dumps, and other operations associated with debugging portable computer system 100.

In one embodiment, there are two different debuggers that can be executed: a "Small ROM" debugger, and a "Big ROM" debugger. The Small ROM provides the bootstrap code used to initialize the hardware on portable computer system 100. The Small ROM provides enough services to boot up portable computer system 100 and flash the Big ROM. The Big ROM includes the same code as the Small ROM, as well as the remainder of the system code.

In one embodiment, the Small ROM debugger is actuated by pressing the reset button while holding the down arrow on portable computer system 100, and the Big ROM debugger is actuated by entering a shortcut command (e.g., "1 . . . 1") on alphanumeric input pad 106 (FIG. 5). In another embodiment, the Big ROM debugger is actuated by resetting portable computer system 100 while holding the down arrow, and then by entering a "g" command while the down arrow is still held. In yet another embodiment, a shortcut command (e.g., "1 . . . 2") is entered on alphanumeric input pad 106; in response, portable computer system 100 and waits for a communication from the debugger.

Interface Method for Selecting Type of Connection

Figure 10:
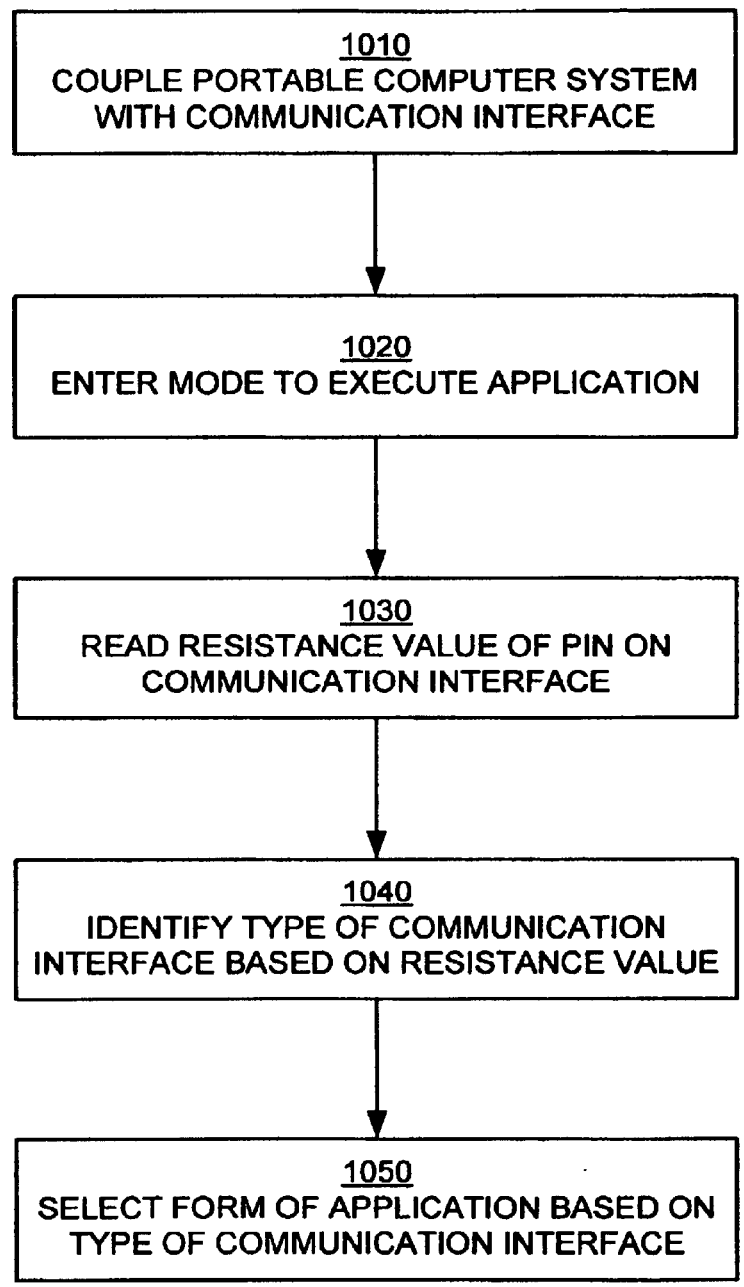
FIG. 10 is a flowchart showing the steps in a process for identifying a type of communication interface and selecting a compatible application in accordance with one embodiment of the present invention.

FIG. 10 is a flowchart of the steps in a process 1000 for automatically identifying the type of communication interface 600 (FIG. 6A) and the form of an application used with the type of communication interface 600 in accordance with one embodiment of the present invention. In the present embodiment, process 1000 is implemented by portable computer system 100 as computer-readable program instructions stored in a memory unit (e.g., ROM non-volatile 103 of FIG. 5) and executed by a processor (e.g., processor 101 of FIG. 5). In one embodiment, process 1000 is performed with a synchronization application as described in conjunction with FIG. 8, and in another embodiment, process 1000 is performed with a debug application as described in conjunction with FIG. 9. However, it is appreciated that process 1000 is not limited to use with synchronization and debug applications, and that process 1000 can be applied with other collaborative and cooperative applications executing over a type of communication interface 600.

In step 1010 of FIG. 10, the portable computer system 100 is coupled with the communication interface 600. In one embodiment, portable computer system 100 is inserted into cradle 60 coupled by connection cable 68 to computer system 56 (FIG. 1). In accordance with the present invention, different types of communication interfaces can be used.

In step 1020 of FIG. 10, the mode of operation for the application of interest is entered in response to input from a user. For example, for a debugger application, the debugger mode is entered, and for a synchronization application, the synchronization mode is entered. In accordance with the present invention, the input from the user is the same regardless of the type of communication interface 600 being used. That is, for a USB connection, an RS232connection, or for any other type of connection, the user enters the same command, or pushes the same button or buttons, to enter the desired mode of operation for executing the application of interest.

For example, in one embodiment, to enter the Small ROM debugger for either a USB connection or an RS232 connection, the user presses the reset button while holding the down arrow on portable computer system 100 (FIG. 1). To enter the Big ROM debugger for either a USB connection or an RS232connection, the user enters a shortcut command (e.g., "1 . . . 1") on alphanumeric input pad 106 (FIG. 5). Other embodiments for entering the Big ROM debugger are described above in conjunction with FIG. 9. In each embodiment, in accordance with the present invention, the user provides the same input for both a USB connection and an RS232 connection. Accordingly, the user does not need to recognize the type of communication interface 600, nor does the user need to distinguish between the types of communication interfaces when entering the desired mode of operation.

In steps 1030 and 1040 of FIG. 10, in accordance with the present invention, the type of communication interface 600 is automatically identified. In the present embodiment, in step 1030, the resistance value of pin 61 (FIGS. 6A and 6B) is read by portable computer system 100. A different resistance value (and a tolerance) is associated with each type of communication interface 600. Thus, in step 1040, the type of communication interface 600 can be identified by portable computer system 100 from the resistance value that is read in step 1030.

Continuing with reference to FIG. 10, in one embodiment of the present invention, when entering the desired mode of operation, a selection software routine is called by portable computer system 100. The selection software routine determines which type of communication interface 600 is being used.

In one embodiment, for the debugger application, a selection routine "HwrSetDebuggerSerialDriver" is called. Both the Small ROM debugger and the Big ROM debugger use the same selection routine. One embodiment of the selection routine "HwrSetDebuggerSerialDriver" is exemplified in Table 1.

TABLE 1

Exemplary Embodiment of Selection Routine for Debugger Application

```
UInt16 HwrSetDebuggerSerialDriver(void)
{
    UInt32      keyState;
    UInt16      dockStatus;
    dockStatus=HwrDockStatus();                              //get what is attached to dock if any
    if (dockStatus & hwrDockStatusUSBCradleAttached)         //USB Cradle
    {
        VDrvUsbDbgInit();                                    //USB debug driver traps
        return hwrSerialDebugSetVdrv;
    }
    else if (dockStatus & hwrDockStatusDockAttached)         //RS232 Cradle
    {
        VDrvSerInit();                                       //RS232 driver traps
        return hwrSerialDebugSetVdrv;
    }
    else if (dockStatus & hwrDockStatusUSBPeripheralAttached) //USB Perf
    {
        VDrvSerInit();                                       //RS232 driver traps
        return hwrSerialDebugSetVdrv;
    }
    else if ((dockStatus & hwrDockStatusModemAttached) ||
             (dockStatus & hwrDockStatusPeripheralAttached)) //Serial Perf/Modem
    {
        VDrvUsbDbgInit();                                    //USB debug driver traps
        return hwrSerialDebugSetVdrv;
    }
    else if (dockStatus & hwrDockStatusMfgTestCradleAttached) //Mfg Test Cradle
    {
        VDrvSerInit();                                       //RS232 driver traps
        return hwrSerialDebugSetVdrv;
    }
    else if (keyState & keyBitPageUp)
    {
        VDrvSerInit();                                       //Load RS232 driver traps
        return hwrSerialDebugSetVdrv;
    }
    else
    {
        VDrvUsbDbgInit();                                    //Load USB debug driver traps
        return hwrSerialDebugSetVdrv;
    }
```

With reference to Table 1, "HwrSetDebuggerSerialDriver" calls the hardware dock (cradle) status routine "HwrDockStatus" to determine what type of communication interface 600 (if any) is attached to portable computer system 100. In the present embodiment, the routine "HwrDockStatus" returns a unique value for each of the following types of connections:

1. USB Cradle;
2. RS232 Cradle;
3. USB Peripheral;
4. RS232 Peripheral;
5. Modem;
6. Manufacturing Test Cradle;
7. No Cradle or Peripheral; or
8. Nothing Attached.

It is appreciated that a similar selection routine can be applied for other types of applications.

With reference again to FIG. 10, in step 1050, the form of application (e.g., the type of application and driver) used with the type of communication interface 600 is selected and executed. In one embodiment, the selection routine (e.g., the debugger selection routine "HwrSetDebuggerSerialDriver") of portable computer system 100 makes an intelligent decision regarding the use of the USB form of application or the RS232 form of application. When portable computer system 100 is coupled to communication interface 600, the selection routine will make a selection from the selections listed in Table 2, based on the type of communication interface 600 (as determined in steps 1030 and 1040).

TABLE 2

One Embodiment of Form of Application Selected for Different Types of Communication Interfaces

| Type of Communication Interface | Form of Application Selected |
| --- | --- |
| USB Cradle | USB |
| RS232 Cradle | RS232 |
| USB Peripheral | RS232 |
| RS232 Peripheral | USB |
| RS232 Modem | USB |
| RS232 Manufacturing Cradle | RS232 |

In the present embodiment, when the USB cradle is identified, the application (e.g., debugger) uses the USB connection. Similarly, when the RS232 cradle is identified, the application uses the RS232 connection. In one embodiment, the manufacturing cradle is the same as the RS232 connection. When the USB peripheral is selected, it is assumed that the USB connection is tied up for use with a peripheral and cannot be used for the application, so the RS232 connection is selected instead. Likewise, when the RS232 peripheral or the RS232 modem is selected and the RS232 connection cannot be used, the USB connection is selected instead. It is appreciated that a similar process can be used for types of connections other than RS232 and USB.

In summary, from the user's perspective, the following steps are performed in one embodiment when entering, for example, the debugger mode of operation, independent of the type of connection cable 68 (e.g., either a USB connection or an RS232 connection) that is coupled to cradle 60 (FIG. 6A):

1. Place portable computer system 100 into cradle 60;
2. Enter appropriate commands for actuating Small ROM debugger and Big ROM debugger (refer to discussion of FIG. 9); and
3. Portable computer system 100 will execute the appropriate form (e.g., driver) of debugger (e.g., either over the USB connection or over the RS232 connection).

In the case in which a mode of operation (e.g., debugger) is entered but portable computer system 100 is not coupled to a communication interface 600, the up button on portable computer system 100 can be used to make the selection, whether booting the system after a reset or entering a shortcut command (e.g., "1 . . . 1" for the debugger). When the up button is not pressed, the USB form of application is selected; when the up button is pressed, the RS232 form is selected.

In summary, in accordance with the present invention, the user does not have to manually identify the type of communication interface in order to select the proper form (e.g., driver) of application. Instead, the user enters a command that is independent of the type of communication interface. In response, the type of communication interface is automatically identified, and the proper form of application is automatically selected. The use of a standard and automatic process that is independent of the type of communication interface in use or the form of the application that is to be executed provides a simplified and convenient process that is user-friendly and that can reduce the potential for error.

Thus, the present invention provides a system and method that can simplify the process for identifying the type of communication interface being used to couple a portable computer system (e.g., a palmtop) and a second (e.g., conventional) computer system. The present invention also provides a system and method that can simplify the process for selecting the form of an application that is used with the type of communication interface in use.

The preferred embodiment of the present invention, interface technique for selecting type of connection, is thus described. While the present invention has been described in particular embodiments, it should be appreciated that the present invention should not be construed as limited by such embodiments, but rather construed according to the below claims.

What is claimed is:

1. In a portable computer system, a method for selecting an application form according to a type of communication interface, said method comprising:

a) entering a mode for executing an application;

b) reading a resistance value of a single pin on a cradle element that receives said portable computer system and that couples said portable computer system to a second computer system, wherein a unique resistance value is associated with each type of communication interface that can be used with said cradle element;

c) identifying a type of communication interface used with said cradle element according to said resistance value read from said single pin;

d) selecting a form of said application used with said type of communication interface identified in said step c); and e) actuating said application in response to a first character entered in a first region of a handwriting recognition pad of said portable computer system and a second character entered into a second region of said handwriting recognition pad, said first region for alphabetic characters and said second region for numeric characters.

2. The method as recited in claim 1 wherein said step c) comprises:

c1) identifying said type of communication interface according to a voltage value for said pin.

3. The method as recited in claim 1 wherein said application is for debugging applications on said portable computer system.

4. The method as recited in claim 1 wherein said application is for sharing information between said portable computer system and said second computer system.

5. The method as recited in claim 1 wherein said type of communication interface comprises a Universal Serial Bus (USB) connection and wherein said application is used with a USB communication interface.

6. The method as recited in claim 1 wherein said type of communication interface comprises an RS232 connection and wherein said application is used with an RS232 communication interface.

7. A portable computer system comprising:

a bus;

a handwriting recognition pad coupled to said bus, said handwriting recognition pad comprising a first region for alphabetic characters and a second region for numeric characters;

a communication interface port coupled to said bus, said communication interface port operable to couple with a cradle element, said cradle element comprising a plurality of pins, wherein a resistance value of a single pin of said plurality of pins indicates a type of communication interface used by said cradle element to communicate with a second computer system also operable to couple with said cradle element; and a processor coupled to said bus;

said processor for performing a method for selecting an application form according to said type of communication interface, said method comprising:

a) entering a mode for executing an application;

b) reading a resistance value of said single pin, wherein a unique resistance value is associated with each type of communication interface that can be used with said cradle element;

c) identifying a type of communication interface according to said resistance value read from said single pin;

d) selecting a form of said application used with said type of communication interface identified in said step c); and e) actuating said application in response to a first character entered in said first region of said handwriting recognition pad and a second character entered into said second region of said handwriting recognition pad.

8. The portable computer system of claim 7 wherein said step c) of said method comprises:

c1) identifying said type of communication interface according to a voltage value for said pin.

9. The portable computer system of claim 7 wherein said application is for debugging applications on said portable computer system.

10. The portable computer system of claim 7 wherein said application is for sharing information between said portable computer system and said second computer system.

11. The portable computer system of claim 7 wherein said type of communication interface comprises a Universal Serial Bus (USB) connection and wherein said application is used with a USB communication interface.

12. The portable computer system of claim 7 wherein said type of communication interface comprises an RS232 connection and wherein said application is used with an RS232 communication interface.

13. In a system comprising a portable computer system and a second computer system communicatively coupled via a cradle element, a method for selecting an application form used with a type of communication interface used by said cradle element, said method comprising:

a) reading at said portable computer system a resistance value of a single pin on said cradle element, wherein a unique resistance value is associated with each type of communication interface that can be used with said cradle element;

b) identifying at said portable computer system a type of communication interface, wherein said type of communication interface is identified by said resistance value read from said single pin;

c) selecting at said portable computer system a form of an application corresponding to said type of communication interface, wherein said application is executed collaboratively on said portable computer system and on said second computer system; and d) actuating said application in response to a first character entered in a first reaion of a handwriting recognition pad of said portable computer system and a second character entered into a second region of said handwriting recognition pad, said first region for alphabetic characters and said second region for numeric characters.

14. The method as recited in claim 13 wherein said step b) comprises:

b1) identifying said type of communication interface according to a voltage value for said pin.

15. The method as recited in claim 13 wherein said application is for debugging applications on said portable computer system.

16. The method as recited in claim 13 wherein said application is for sharing information between said portable computer system and said second computer system.

17. The method as recited in claim 13 wherein said type of communication interface comprises a Universal Serial Bus (USB) connection and wherein said application is used with a USB communication interface.

18. The method as recited in claim 13 wherein said type of communication interface comprises an RS232 connection and wherein said application is used with an RS232 communication interface.

* * * * *